United States Patent Office 3,127,196
Patented Mar. 31, 1964

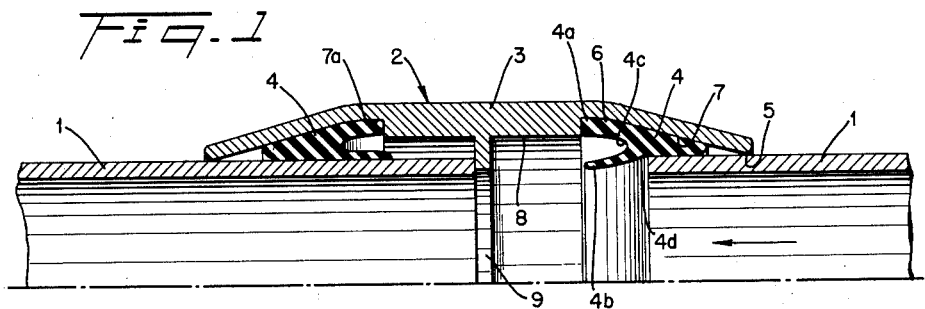
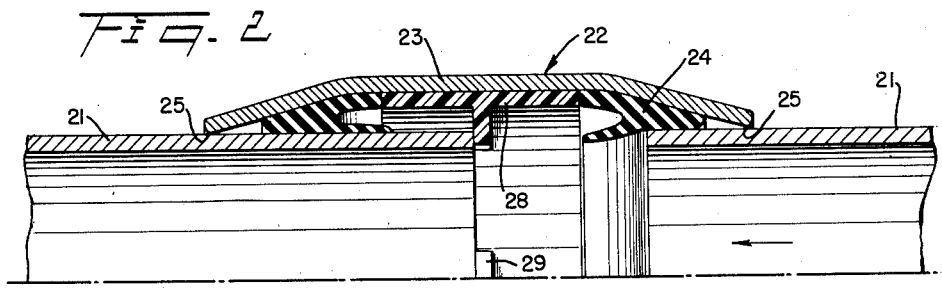
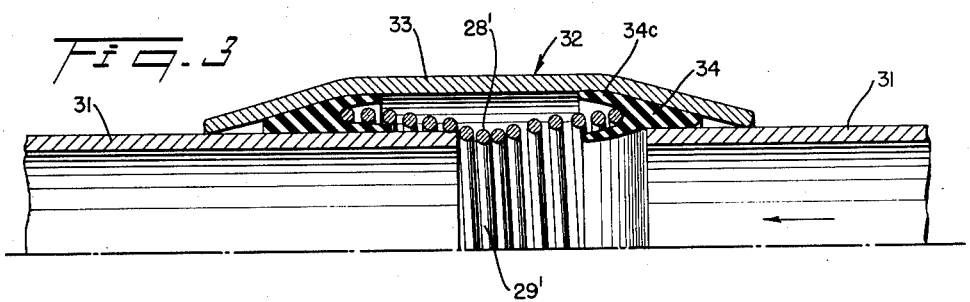
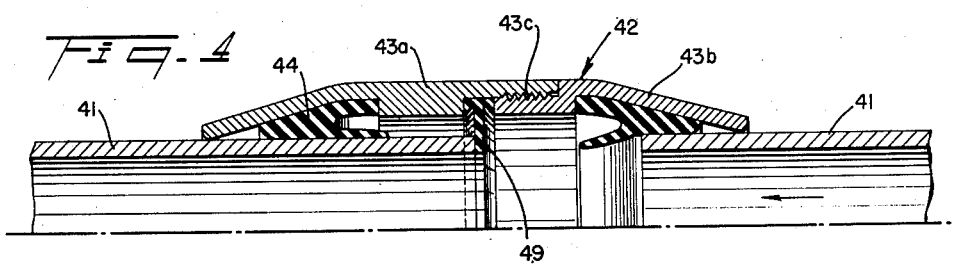

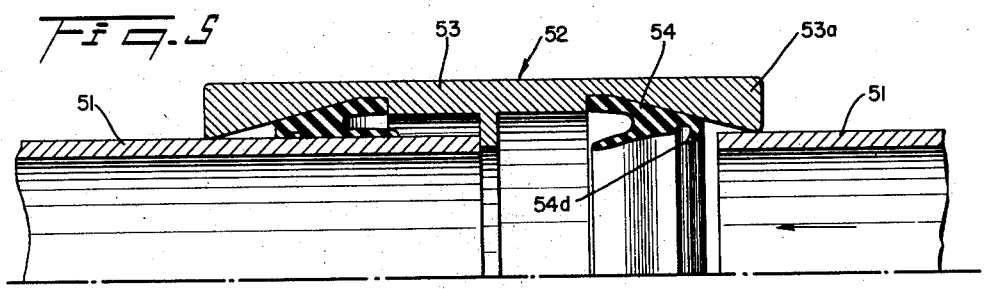
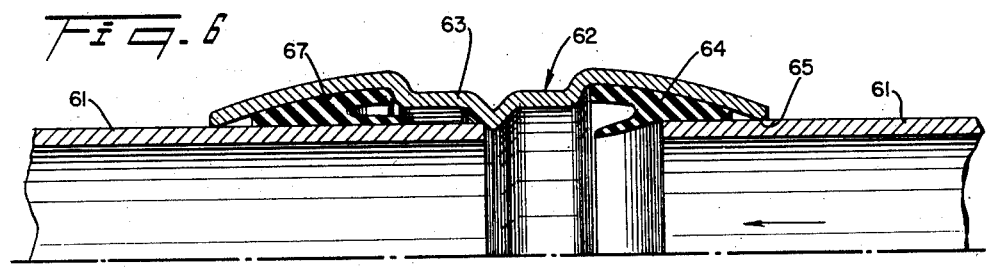
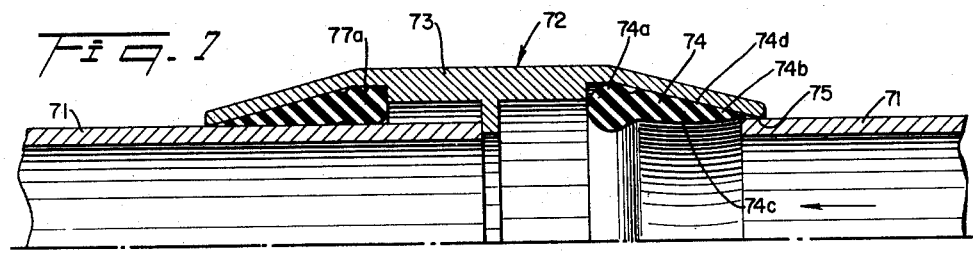
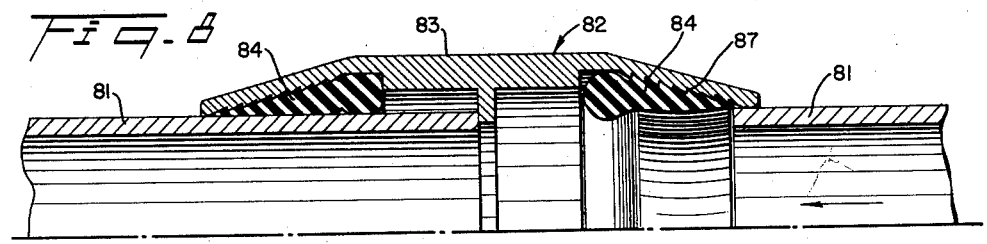

3,127,196
WEDGED GASKET COUPLING UTILIZING DIFFERENTIAL COEFFICIENTS OF FRICTION
Francis G. Fabian, Jr., and John P. Mann, Bradford, Pa., assignors to Dresser Industries, Inc., Dallas, Tex., a corporation of Delaware
Filed May 22, 1959, Ser. No. 815,078
5 Claims. (Cl. 285—111)

The present invention relates to pipe joints and in particular to pipe joints in which a plain end pipe section is received in a coupling having a gasket which provides a fluidtight seal. The term "pipe" is herein used in a generic sense to include pipe, tubing, conduits, shafts and like members. The term "coupling" is herein used to include sleeves, T's, elbows, caps, plugs, valves and other fittings.

When a pipeline consisting of a series of pipe sections connected by joints is subjected to internal pressure as it customarily is when in service, the line pressure exerts forces tending to separate the joints. Moreover, a pipe line is usually subjected to other forces, for example external mechanical forces and forces resulting from the weight of the pipe in vertical lines and from thermal expansion and contraction. It is hence necessary to provide means to prevent separation of the pipeline at the joints. This has heretofore been attained by using threaded joints or by providing the pipe with a circumferential groove into which a coupling locks. Alternatively, the pipe sections may be joined by couplings having pressure-type gaskets with bolts or threaded couplings which can be screwed up to apply high mechanical pressure to the gasket. While such couplings are satisfactory for many installations and have been widely used, it is desirable to provide couplings which are less expensive to manufacture and install.

It is an object of the present invention to provide a simple and inexpensive pipe coupling that can be used with plain end pipe and provides not only a fluidtight joint but also high pull-out resistance. With a pipe coupling in accordance with the invention, a joint is easily and quickly effected merely by stabbing a plain end pipe into the coupling. No operations such as tightening bolts, nuts, collars or other mechanical devices is required. An annular gasket in the coupling not only provides a fluidtight seal but also holds the pipe securely in the coupling. A further feature of the couplings in accordance with the present invention is that they are of small overall diameter and of smooth contour so that they can be easily taped or otherwise covered or coated along with adjacent portions of the pipe sections to provide corrosion resistance.

The objects, characteristics and advantages of pipe joints in accordance with the present invention will be more fully understood from the following description and claims in conjunction with the accompanying drawings which illustrate preferred embodiments of the invention by way of example. In the drawings:

FIG. 1 is an axial half section of a pipe joint in accordance with the invention comprising two pipe sections and a connecting coupling, one pipe section being shown in place and the other in the process of being introduced into the coupling.

FIGS. 2 to 8 are similar axial half sections showing other embodiments and modifications.

In FIG. 1 there is shown by way of example a pipe joint in accordance with the invention comprising two plain end pipe sections 1 and a coupling 2 comprising a body portion in the form of a sleeve member 3 and gaskets 4. Each of the pipe sections 1 has an end portion with a continuous cylindrical surface which is not threaded, grooved or otherwise interrupted. The coupling sleeve 3 is shown as being double ended and symmetrical about a central transverse plane. At each end the sleeve 3 is restricted to provide a circular pipe aperture 5 having an inside diameter only slightly greater than the outside diameter of the pipe 1 so as to fit closely around the pipe while permitting a pipe section to be stabbed into the sleeve freely. Axially inwardly of the pipe aperture 5 the sleeve 3 is of greater inside diameter to provide an annular gasket recess defined by an annular shoulder 6 to a zone of minimum diameter merging smoothly into the pipe aperture 5 which is rounded to avoid sharp edges. As illustrated in FIG. 1, a portion 7a of the surface 7 adjacent the shoulder 6 is substantially cylindrical while the balance of the surface is substantially conical. The surface 7 is inclined at an acute angle to the axis of the sleeve having a value of the order of 10 to 20 degrees. It has been found that an optimum angle is of the order of 15 degrees. The central portion of the sleeve 3 between the shoulder 6 has an inner surface 8 which is substantially cylindrical with a diameter greater than that of the pipe apertures 5 but less than the maximum diameter of the gasket recesses. At approximately its center, the sleeve 3 is provided internally with a pipe stop 9 consisting of one or more inward projections or, as illustrated in FIG. 1, a continuous inwardly projecting ring having an inside diameter approximately equal to the inside diameter of the pipe.

Each of the gaskets 4 is formed of elastomer material, for example a natural or synthetic rubber composition. The gasket material is preferably elastic yet firm with a durometer of the order of 60 to 80 and a high shear strength. Preferably the durometer of the gasket material is approximately 68 to 73. As seen in the drawings, the gasket 4 is wedge-shaped in cross section. The outer surface of the gasket is substantially frusto-conical and engages the tapered surface 7 of the gasket recess. The inner surface of the gasket engages the cylindrical surface of the pipe section 1. The inner surface of the nose of the wedge-shaped gasket is preferably curved outwardly as shown so as to intersect the outer surface at approximately right angles. At its axially inner end the gasket is of fishtail configuration with a thicker outer flange portion 4a and a thinner inner flange portion 4b separated by an intervening recess 4c. In free condition, the outside diameter of the outer flange 4a is substantially equal to the maximum diameter of the gasket recess so that the flange seats on the surface 7a when the gasket is in place. The end of the outer flange 4a seats against the shoulder 6 at least the inner portion of which is radial. The inner diameter of the axially outer portion of the gasket 4, i.e. the portion near the nose, is approximately equal to the outside diameter of the pipe so that the pipe section can be stabbed into the pipe aperture of the gasket without undue resistance. The inner diameter of the inner flange 4b of the gasket in free condition is materially less than the outside diameter of the pipe as will be seen at the right hand end of the coupling shown in FIG. 1 where the pipe is stabbed only part way into the coupling. As the pipe is stabbed further in the flange portion 4b is expanded and thereby stretched—preferably about 8%—so that it grips the pipe to provide an initial fluidtight seal and also an initial gripping action on the pipe. Moreover, a portion 4d of the gasket axially outwardly of the recess 4c has a radial thickness greater than the radial distance between the contiguous portions of the sleeve 3 and pipe 1 so that the gasket portion 4d is compressed slightly in a radial direction when the pipe is stabbed in. This compression further assures an initial fluidtight seal. Engagement of the outer flange 4a with the shoulder 6 prevents the gasket 4 from being displaced axially inwardly as the pipe is stabbed in. The larger inside diameter of the central portion 8 of the sleeve 3 permits the inner flange 4b to extend axially inwardly as seen at the left hand side of FIG. 1 without being pinched between the pipe and the coupling.

In accordance with the invention the coefficient of friction between the inner surface of the gasket 4 and the cylindrical surface of the pipe 1 is materially greater than the coefficient of friction between the outer surface of the gasket and the tapered surface 7 of the gasket recess and is preferably at least 3 or 4 times as great. This difference in the coefficient of friction is obtained either by increasing the friction between the inner surface of the gasket and the pipe or decreasing the friction between the outer surface of the gasket and the sleeve or both. In a preferred embodiment of the invention the surface 7 of the gasket recess is provided with a smooth finish and is covered or coated with a material reducing the coefficient of friction. For example the surface is covered with a permanent thin layer of a low friction material, for example tetrafluoroethylene resin—sold commercially under the name "Teflon." The resin is conveniently applied as a water dispersion and then sintered at a temperature of the order of 750° F. Two or more coatings may be applied if desired. Other low friction materials for coating the gasket recess surface 7 include fluorochloro carbons such as trifluorochlorethylene sold under the trade name "Kel-F."

The outer surface of the gasket is preferably also treated to reduce the coefficient of friction. For example the gasket may be formed of a rubber composition, the outer surface of which is halogenated, for example by being treated with bromine. For convenience of manufacture, the entire gasket is subjected to the halogenating treatment and the inner surface of the gasket is then ground or buffed to remove the halogenated layer. A relatively higher coefficient of friction between the inner surface of the gasket and the pipe is thereby provided. In assembling the pipe joint care should be taken to see that the end portion of the pipe is free from grease or other substance that would act as a lubricant.

The gaskets 4 are sufficiently flexible that they can be squeezed in from opposite sides and slipped into the coupling through the pipe aperture 5 and then allowed to expand into proper position in the gasket recess. The plain end pipe is then merely stabbed axially into the coupling as indicated by the arrow in FIG. 1. Inward movement of the pipe is limited by the pipe stop 9. By reason of the initial gripping action of the gasket on the pipe as described above and the difference between the coefficients of friction, the gasket tends to move axially outwardly with the pipe if a force is applied in a direction to withdraw the pipe from the coupling. This causes the gasket to wedge tightly between the pipe wall and the tapered surface 7 of the gasket recess. The wedging action has been found to be so great as to prevent any appreciable slippage of the gasket on the pipe. In joints tested under tension to failure it has been found that failure occurs only through shearing of the rubber gasket after expansion of the end portion of the coupling so as to enlarge the pipe aperture 5. It has been found that the joint is capable of withstanding extremely high pull-out forces for example a force of more than 5000 pounds.

A further embodiment of the invention is illustrated in FIG. 2 in which corresponding parts are designated by the same reference numerals as in FIG. 1 with the addition of 20. The pipe joint is shown as comprising plain end pipe sections 21 joined by a coupling 22 comprising a sleeve 23 and annular gaskets 24. The construction is substantially the same as shown in FIG. 1 except that a central portion 28 of the sleeve 23 is formed as a separate collar member which may conveniently be molded of plastic material. The pipe stop 29 is shown in the form of a plurality of circumferentially spaced inwardly projecting lugs integral with the collar 28. With the collar 28 thus formed as a separate member, the sleeve 23 may be conveniently and economically fabricated from seamless tubing by inserting the collar 28 in a section of tubing and then swaging in the end portions of the tube to provide pipe apertures 25 and adjacent gasket recesses.

Another embodiment of the invention is shown in FIG. 3 in which corresponding parts are designated by the same reference numerals as in FIG. 1 with the addition of 30. The joint comprises plain end pipe sections 31 joined by a coupling 32 comprising a sleeve 33 and gaskets 34. A helical compression spring 28' is disposed inside the central portion of the sleeve 23. Opposite ends of the spring engage in the recesses 34c of the gaskets 34 and act axially outwardly on the gaskets so as to initiate and increase the wedging action described above. One or more central convolutions 29' of the spring are of smaller inside diameter than the outside diameter of the pipe 31 so as to provide a pipe stop.

A further embodiment of the invention is illustrated in FIG. 4 in which corresponding parts are designated by the same reference numerals as in FIG. 1 with the addition of 40. The joint comprises pipe section 41 joined by a coupling 42 comprising a sleeve composed of two sections 43a and 43b joined by interengaging threads 43c. A T-shaped gasket 49 provides a fluidtight seal between the sleeve sections and also provides a pipe stop. The two piece construction facilitates manufacture of the coupling. The pipe joint shown in FIG. 4 is otherwise substantially the same as that of FIG. 1. It will be noted that in all the forms described the pipe aperture is formed with a smooth radius in cross section so as to avoid cutting or shearing of the gasket.

Another embodiment of the invention is illustrated in FIG. 5 in which corresponding parts are designated by the same reference numerals as in FIG. 1 with the addition of 50. The joint is shown as comprising two pipe sections 51 joined by a coupling 52 comprising a sleeve 53 and gaskets 54. The outer surface of the sleeve 53 is substantially cylindrical throughout its length. This results in end portions 53a being of greater wall thickness and thereby capable of resisting higher forces. As the wedging action of the gasket described above exerts forces tending to expand the end portion of the sleeve, the greater strength provided by the construction shown in FIG. 5 is advantageous. Gaskets 54 are essentially the same as the gaskets shown in preceding figures except that each gasket is provided at its axially outer end or nose with a flexible inwardly projecting annular lip 54d having an internal diameter—in free condition—less than the outside diameter of the pipe 51. When a pipe is stabbed into the coupling, the lip 54d exerts a squeege or wiping action on the pipe so as to remove any grease, dirt or other substance that might reduce the coefficient of friction between the inner surface of the gasket and the pipe wall. The lip 54d also provides an initial fluid seal with respect to both internal and external fluids.

A modification is shown in FIG. 6 in which corresponding parts are designated by the same reference numerals as in FIG. 1 with the addition of 60. The joint is shown as comprising two plain end pipe sections 61 joined by a coupling 62 comprising a sleeve 63 and annular gaskets 64. The construction is similar to that of FIG. 5 but differs in that the sleeve 63 is formed from a length of seamless tubing by expanding or contracting selected portions to provide the desired shape. The tapered surface 67 defining the gasket recess is concavely curved as viewed in axial section. By reason of this curvature the wedging angle of the gasket is less at the start so as to initiate the wedging action and progressively increases as the gasket moves toward the pipe aperture 65 so as to decrease the shear force exerted on the gasket. For other applications the curvature may be reversed to provide a progressive decrease of the wedging angle and thereby increase the wedging action as the gasket moves toward the pipe aperture 65.

Another embodiment of the invention is illustrated in FIG. 7 in which corresponding parts are designated by the same reference numerals as in FIG. 1 with the addition of 70. The joint is shown as comprising plain end pipe section 71 joined by a coupling 72 comprising a sleeve 73 and annular gaskets 74. Each of the gaskets comprises an axially inner portion 74a of substantially circular cross section so as to constitute an O-ring. The axially outer portion 74b of the gasket is wedge shape in cross section with an inner surface 74c which is substantially cylindrical and an outer surface 74d which tapers axially and radially inwardly toward the pipe aperture 75. At its outer end the gasket 74 has an inside diameter substantially equal to the outside diameter of the pipe so that a pipe section freely enters the pipe opening of the gasket. As the pipe is stabbed further in, the O-ring portion 74a is compressed and expanded as illustrated at the left hand end of the coupling so as to provide an initial fluidtight seal and a gripping action on the pipe. It will be seen that the wall portion 77a of the gasket recess engaged by the O-ring portion 74a of the gasket is substantially cylindrical for cooperation in obtaining an effective O-ring seal.

A further modification is shown in FIG. 8 in which corresponding parts are designated by the same reference numerals as in FIG. 1 with the addition of 80. The joint is shown as comprising pipe sections 81 joined by a coupling 82 comprising a sleeve 83 and annular gaskets 84. The construction is substantially the same as illustrated in FIG. 7 except that the surface 87 of the gasket recess and the engaging outer surface of the gasket 84 are provided with a series of small annular shoulders so that the surface is of sawtooth configuration as viewed in axial section. The shoulders provide a pawl and ratchet action so that if a repeated pull-out force is exerted on the pipe, for example by repeated thermal contraction and expansion, the gasket will wedge tightly in the gasket recess and will be held by the teeth or shoulders on the surface 87 against axially inward movement to release the gripping action.

Except as otherwise shown and described the embodiments illustrated in FIGS. 2 to 8 are like that of FIG. 1. In particular the coefficient of friction between the inner surface of the gasket and the pipe is several times that between the outer surface of the gasket and the gasket recess of the sleeve so as to assure a wedging action resisting pull-out of the pipe. For example by treating the surfaces as described above, a coefficient of friction of the order of .04 can be obtained between the outer surface of the gasket and the engaging surface of the gasket recess in contrast to a coefficient of friction of approximately 0.8 to 1.2 obtained between the inner surface of the gasket and the pipe by using a rubber gasket and steel pipe. It will be understood that the several features of the different embodiments are mutually interchangeable and that still other modifications may be made in the details of construction. The invention is thus in no way limited to the embodiments shown by way of example in the drawings.

What we claim and desire to secure by Letters Patent is:

1. A pipe joint comprising a plain end pipe section having an end portion with a continuous cylindrical surface and a coaxial sleeve portion receiving the end portion of said pipe section and having a pipe-receiving aperture closely surrounding the pipe section and an annular gasket recess axially inwardly of said aperture, said recess having a zone of maximum diameter spaced axially inwardly from said aperture and a surface of revolution that tapers axially outwardly and radially inwardly from said zone of maximum diameter to said aperture at an angle of the order of ten to twenty degrees to the axis of said pipe section and of said sleeve portion, and a contractible gasket of firm elastomer material seated in said recess, said gasket being wedge shaped in cross-section and having an inner surface engaging the cylindrical surface of said pipe end portion, a tapered outer surface engaging said tapered surface of said gasket recess, an axially outer nose portion having an inside diameter greater than the outer diameter of said pipe section and an axially inner end portion which in free condition has a greater radial dimension than the radial distance between the pipe section and said zone of maximum diameter of the gasket recess so that when the pipe section is stabbed into said sleeve portion with the gasket seated in said recess said inner end portion of the gasket is compressed radially to provide an initial fluid seal between said pipe section, means within said sleeve engaging said gasket to limit the axially inward movement thereof, means providing a coefficient of friction between the inner surface of said gasket and the surface of said pipe section at least approximately four times as great as the coefficient of friction between the outer surface of said gasket and said tapered surface of said gasket recess so that an outward pull on said pipe section causes said gasket to undergo limited axially-outward sliding movement relatively to the surface of said recess in said sleeve portion while undergoing corresponding concurrent axially-outward movement with said pipe section, and said gasket is thereby caused to wedge tightly between said pipe section and said tapered surface of said gasket recess to lock said pipe section against withdrawal from said sleeve.

2. A pipe joint according to claim 1, wherein said tapered surface of the gasket recess comprises a continuous layer of sintered tetrafluoroethylene resin.

3. A pipe joint according to claim 1, further comprising resilient means exerting a force on said gasket tending to move it in an axially-outward direction relative to said sleeve portion.

4. A pipe joint according to claim 1, wherein the coefficient of friction between said outer surface of said gasket and said tapered surface of said gasket recess is of the order of .05 and the coefficient of friction between the inner surface of said gasket and said pipe section is of the order of 1.

5. A locking pipe coupling comprising a pipe having an end portion with a cylindrical surface, a sleeve member receiving said end portion of said pipe and shaped internally to define an annular gasket recess having an axially-inner wall approximately normal to the axis of said sleeve and an axially-outer wall which tapers radially-inwardly and axially-outwardly relatively to a pipe receiving aperture closely encircling said pipe, said outer wall being inclined at an angle of the order of 10 to 15 degrees to said axis, an annular gasket of elastomer material seated in said recess, said gasket having an inner surface frictionally engaging said pipe and a tapered outer surface engaging said outer wall of said gasket recess, the axially inner end portion of said gasket being of fishtail configuration in axial section with radially inner and outer flanges separated by an annular recess, said outer flange having a greater outside diameter than the minimum inside diameter of said axially-inner wall whereby said outer flange abuts said axially-inner wall to limit the axial inner movement of said gasket, means providing the interengaging surfaces of said gasket and said gasket recess with a coefficient of friction not exceeding one quarter of the coefficient of friction of the interengaging surfaces of said gasket and said pipe so that an outward pull on said pipe section causes said gasket to undergo limited axially-outward sliding movement relatively to the surface of said recess in said sleeve portion while undergoing corresponding concurrent axially-outward movement with said pipe section, and said gasket is thereby caused to wedge tightly between said pipe section and said tapered surface of said gasket recess to lock said pipe section against withdrawal from said sleeve.

References Cited in the file of this patent
UNITED STATES PATENTS

| | | |
|---|---|---|
| 1,022,306 | Donahue | Apr. 2, 1912 |
| 1,931,922 | Damsel | Oct. 24, 1933 |
| 1,945,293 | Pierce | Jan. 30, 1934 |
| 2,017,994 | Spang | Oct. 22, 1935 |
| 2,209,235 | Nathan | July 23, 1940 |
| 2,210,826 | Williams | Aug. 11, 1940 |
| 2,215,704 | Ladd | Sept. 24, 1940 |
| 2,226,304 | Dillon | Dec. 24, 1940 |
| 2,259,940 | Nathan | Oct. 21, 1941 |
| 2,327,293 | Twyman | Aug. 17, 1943 |
| 2,837,353 | Ashbrook | June 3, 1958 |
| 2,907,590 | Oswald | Oct. 6, 1959 |